(12) United States Patent
Hobbs (10) Patent No.: US 7,328,998 B2
(45) Date of Patent: Feb. 12, 2008

(54) SPECIALLY TINTED LENSES FOR SUNGLASSES FOR USE DURING FLYING

(76) Inventor: Raymond L. Hobbs, P.O. Box 701502, Tulsa, OK (US) 74170-1502

( * ) Notice: Subject to any disclaimer, the term of this patent is extended or adjusted under 35 U.S.C. 154(b) by 0 days.

(21) Appl. No.: 11/421,355

(22) Filed: May 31, 2006

(65) Prior Publication Data

US 2007/0285613 A1    Dec. 13, 2007

(51) Int. Cl.
*G02C 7/16* (2006.01)
(52) U.S. Cl. .......................................... 351/45; 351/46
(58) Field of Classification Search ................ 351/45, 351/46, 44, 41, 159
See application file for complete search history.

(56) References Cited

U.S. PATENT DOCUMENTS

| | | |
|---|---|---|
| 1,067,793 A | 7/1913 | Barr |
| 1,257,667 A | 2/1918 | Barr |
| 1,637,406 A | 8/1927 | Brumder |
| 1,706,429 A | 3/1929 | Willard |
| 2,045,399 A | 6/1936 | McMurdo |
| 2,076,432 A | 4/1937 | Kinney |
| 2,409,356 A | 10/1946 | Hutchings |
| 3,791,722 A | 2/1974 | Ahlberg et al. |
| 4,168,111 A | 9/1979 | Baines |
| 4,338,003 A | 7/1982 | Adrian |
| 4,824,234 A * | 4/1989 | Sparks et al. ................ 351/47 |
| 5,177,510 A | 1/1993 | Peters et al. |
| 5,189,445 A | 2/1993 | Stagner |
| 5,432,568 A * | 7/1995 | Betz et al. ................... 351/45 |
| 5,440,359 A * | 8/1995 | Bloch-Malem ............. 351/203 |
| 5,682,220 A | 10/1997 | Sherman et al. |
| 5,975,695 A | 11/1999 | Baiocchi et al. |
| 6,450,636 B1 | 9/2002 | Ylipelkonen |
| 6,623,116 B2 | 9/2003 | Kerns, Jr. et al. |
| 6,692,127 B2 * | 2/2004 | Abitbol et al. .............. 351/227 |

* cited by examiner

*Primary Examiner*—Hung Xuan Dang
(74) *Attorney, Agent, or Firm*—Head, Johnson & Kachigian, P.C.

(57) ABSTRACT

The present invention is directed toward specially tinted lenses for use in flying airplanes. In the present invention, the far field of vision is highly tinted to reduce the light from a sunlit sky, over sunlit cloud tops, or in clouds. This enables an aircraft pilot to easily see out of the cockpit into highly illuminated environments. The intermediate field of vision is essentially clear to enable the pilot to easily see a dimly illuminated instrument panel as compared to outside the aircraft. The near field of vision may have a range of tinting from clear to up to a medium tinted value for reading maps and other material. In addition, the change in tinting is discontinuous, that is, sharp, from one field of vision to another. The present invention works because the aircraft structure, that is, the nose and instrument panel, blocks outside light from coming into the intermediate field of vision where the lens is clear.

20 Claims, 4 Drawing Sheets

Figure 4

# SPECIALLY TINTED LENSES FOR SUNGLASSES FOR USE DURING FLYING

BACKGROUND OF THE INVENTION

1. Field of the Invention

The present invention is directed to special-purpose sunglasses with lenses for use during flying a jet aircraft. These sunglasses reduce glare from high illumination in the far field of vision when viewing in the intermediate or near fields of vision. These lenses greatly improve the pilot's ability to see the instrument panel and make viewing between highly contrasting fields of vision less stressful to the eyes.

2. Prior Art

In the field of optical wear, a wide variety of sunglasses and goggles have been developed over the years for various purposes, depending upon the specific function of the sunglasses or the activity involved while wearing the sunglasses. Optical wear has been created to reduce glare from point sources of light, such as from oncoming cars or from direct sunlight. Optical wear has also been created to reduce the glare from broad regions of high illumination, such as office lighting, sky glare, and ground glare. Optical wear also has been developed for directing sight into specific fields of vision. This type of eyewear enables the viewer to assume a correct posture or position for carrying out a physical activity; the great majority of the prior art in this application has been in developing golfing glasses. Finally, optical wear has been designed to reduce visual stress in contrasting lighting situations and to enhance feature extraction in different fields of vision, these types of optical wear can be useful during physical activities where it is desirable to see a specific object against a background, such as golfing, fishing, hunting or other outdoor recreational activities.

One area that prior art has not addressed is the situation encountered by pilots of jet aircraft, which are flown typically at altitudes between 35,000 and 45,000 feet. At these heights during the day, the illumination from outside the cockpit is especially high. The high illumination comes from scattered light from both the sky and clouds. Indeed, when flying over clouds, pilots typically experience illumination values around 9,000 lux even when they are not looking in the direction of the sun. By contrast, under these external lighting conditions, the illumination of the instrument panel can be typically around 30 lux. In this case, the ratio between the outside illumination to that of the instrument panel is 300 to 1. Making transitions between these two contrasting fields of illumination can be stressful to the eyes.

Of the variations of sunglasses disclosed in prior art, none has satisfactorily solved the problem of balancing the illumination between outside and inside the cockpit—a problem that pilots flying at altitude encounter. Ordinary dark sunglasses do not solve this problem; while they do reduce the outside illumination to a comfortable level for the pilot, they can render the instrument panel too dark for the pilot to discern readings on the gauges. On the other hand, vignetted sunglass lenses assist in the overall balancing of illumination outside the cockpit with that of the instrument panel, but they permit too much light to enter a pilot's eyes, thus causing glare when the pilot views the instruments.

The limitations of prior art described above highlight the need for sunglasses that specifically address the two and often related problems that many jet pilots routinely encounter when flying at altitude: that is, (1) the contrast in illumination causes stress on the pilot's eyes resulting from the eyes having to adjust back and forth between the high illumination from outside the cockpit and the low illumination from the instrument panel; and (2) the glare caused by the high illumination can degrade the ability of the pilot to adequately see the instruments. Moreover, these two problems are exacerbated as the pilot ages.

To fully understand the problem the present invention solves, it is helpful to define the difference between the horizon and the horizontal plane in which the aircraft is flying. The horizon is plane tangent to the earth's surface at an observer's position and the horizontal plane is perpendicular to the vertical axis to the earth. Between 35,000 ft and 45,000 ft the horizon is approximately 3.3° to 3.8° below the horizontal plane. Consequently, whenever the aircraft is above a uniform layer of cloud that extends to the horizon, the illumination from that cloud layer originates from below the horizontal plane.

The illumination that a pilot experiences when flying at these high altitudes can be significantly different from that experienced by a person on the ground. For example, when pilots fly above the clouds, the illumination experienced when they look horizontally and below is typically greater than when they look above the horizontal plane. This high illumination at and below the horizontal plane poses a unique problem for pilots when they look at the instruments in that the high illumination from outside the cockpit can be relatively close to their intermediate field of vision of the instruments. The reverse tends to be the case for a person on the ground, where the illumination generally increases when looking upwards.

The lenses of the present invention, when adapted to sunglasses, enable a pilot to easily view outside the cockpit into high illumination and simultaneously view the instrument panel in low illumination without the eyes having to compensate for the previously described problems of adjustment and glare. This invention reduces visual stress to the eyes by greatly reducing the difference in illumination as received by the eyes between lighting outside the cockpit and the instrument panel. In addition, this reduction in light received by the eyes from outside the cockpit greatly reduces glare that can impair the pilot's vision of the instrument panel.

The present invention addresses the specific and unique condition present in the cockpit of a jet aircraft where the instrument panel and nose of the aircraft block the high illumination from outside the cockpit from entering the intermediate section of the lenses.

The following United States Patents are representative of the prior art and are incorporated herein by reference.

Kerns, Jr. et al. (U.S. Pat. No. 6,623,116) discloses eyeglass lenses with multiple optical zones having varying optical properties for enhanced visualization of different scenes in outdoor activities. The different optical zones in the lenses can be arranged in typical bi-focal fashion with an abrupt line transmission between an upper and lower zone. Alternatively, the second optical zone can be an oval or circle positioned in a specific location within the lens body. This patent does not disclose three distinct areas on the lens for far, intermediate and near vision, nor does this patent disclose glare reduction from light coming to the viewer from the far field of vision. In addition, this patent does not disclose the need to balance the light intensity between the different fields of vision.

Baiocchi, et al. (U.S. Pat. No. 5,975,695) discloses an optical element that balances the contrast between high and low illuminations and uses selected spectral transmittance for feature enhancement. Even though a particular embodiment states the patent is suitable for flying aircraft, this invention has vignetted lenses, which have high density tinting at the top of the lenses and transition to less density towards the lower portion of the lens. This patent is directed primarily to address two different fields of vision and does not disclose glare reduction. Unlike the present invention, this patent does not disclose non-vignetted lenses with a sharp (discontinuous) transition between the field of vision for viewing the sky and the field of vision for viewing the instrument panel. This patent also does not disclose three distinct areas on the lens for far, intermediate and near vision, nor does this patent disclose glare reduction from light coming to the viewer from the forward direction. In addition, this patent does not disclose the need to balance the light intensity between the different fields of regard.

In the Baiocchi patent, the ratio of transmittance between the lighter tinted portions of the lens to the darker tinted portion of the lens is between 1.5 to 7, preferably between 2.5 and 6.5. In the present invention, this ratio is between 4 and 64, preferably between 8 and 16. The present invention is made to be used in lighting situations that are highly contrasting.

Sherman, et al. (U.S. Pat. No. 5,682,220) discloses sunglasses that provide highlighted vision through a vision directing section so that the wearer's vision is directed to that portion of their field of vision. This patent does not disclose glare reduction, and these sunglasses can be worn anytime and anywhere a person would wear normal sunglasses. This patent does not balance the light from the far field, intermediate field and near field in order to enable the viewer to see equally well in all three fields of regard. This patent also does not disclose lenses to be used to reduce glare when a pilot views the instrument panel, when glare is caused by high illumination from outside the cockpit.

In the Sherman patent the far field of vision area of the lens has a range of transmittance between 53 and 30%. In the vision directing section of the lens the range in transmittance is between 75 and 50%. This patent is directed towards sunglasses that would be appropriately used in environments having normal brightness. These sunglasses are not designed for use in environments having high to exceptionally high brightness, where the present invention is intended for use.

In the Sherman patent, the ratio of the transmittances between the vision directed portion of the lens to the far field portion of the lens varies between 1.43 and 1.67. These are low values and indicate that the vision directed portion of the lens only highlights this region of viewing as compared to the far field of vision. Simply put, the vision directed portion of the lens just reminds the viewer where to look. These sunglasses will not enable the viewer to look into highly contrasted illuminated scenes. In the present invention, the ratio between the transmittance of the intermediate and far fields of vision is preferably between 4 and 16.

Gilson, et al. (U.S. Pat. No. 4,542,964) discloses eyewear to be worn primarily in the office environment to enable the viewer of a visual display terminal or monitor to comfortably view the monitor over extended periods of time. In this patent, the upper portion of the lenses is opaque and not intended permit viewing; in addition, the lenses are primarily intended to be used for intermediate viewing. This patent does not disclose three distinct areas on the lens for far, intermediate and near vision, nor does this patent disclose glare reduction from light coming to the viewer from the forward direction. In addition, this patent does not disclose the need to balance the light intensity between the different fields of regard.

Adrian, et al. (U.S. Pat. No. 4,338,003) discloses glasses used to mitigate glare primarily from point sources of light from oncoming headlights and in an office environment. This patent discloses that the density of the tinting of the lenses is a function of the angle from the center of the viewer's eye with a maximum absorption being approximately 0.85 and a minimum transmittance being approximately 0.15. The lenses of the present invention have transmittance that could range from 0.25 to 0.03, in other words, the lenses of the present invention are much darker than those in Adrian's patent. Adrian's patent is not intended for use as sunglasses in high luminous environments and does not disclose three distinct areas on the lens for far, intermediate and near vision.

Hutchings (U.S. Pat. No. 2,409,356) discloses a goggle for aviators where brilliant sunlight is encountered such as in flight over bodies of water or deserts, both of which reflect a large amount of solar light. The surface of the lens is coated with a film on upper and lower portions while the central portion is clear. This patent is directed towards the creation of tintings on lenses that have a gradient density (introduction of vignetted sunglasses). This patent also does not disclose three distinct areas on the lens for far, intermediate and near vision, nor does this patent disclose glare reduction from light coming to the viewer from the forward direction. In addition, this patent does not disclose the need to balance the light intensity between the different fields of regard.

Barr (U.S. Pat. No. 1,067,793) discloses automobile driving goggles with a large portion tinted for sunlight and a smaller part which is clear. The purpose of this invention is to enable the viewer to look directly towards oncoming headlights or the sun. This patent does not balance the light from multiple fields of vision, but rather blocks a temporary bright light source in the far field of vision. This patent also does not disclose three distinct areas on the lens for far, intermediate and near vision, nor does this patent disclose glare reduction from light coming to the viewer from the forward direction. In addition, this patent does not disclose the need to balance the light intensity between the different fields of vision.

SUMMARY OF THE INVENTION

The present invention is directed to specially tinted lenses for use in flying airplanes. In the present invention, the far field of vision has medium to exceptionally dark tinting (Filter category between 2 and 6) to reduce the light from a sunlit sky, over sunlit cloud tops or in clouds. This enables an aircraft pilot to easily see out of the cockpit into highly illuminated environments. The intermediate field of vision is essentially clear (Filter category 0) to enable the pilot to easily see a dimly illuminated instrument panel as compared to the high illumination outside that aircraft. The near field of vision may have a range of tinting from clear (Filter category 0) to mediam (Filter category 3) for reading maps, etc. In addition, the change in tinting is discontinuous (i.e., sharp) from one field of vision to another. The present invention works because the aircraft structure (i.e., nose and instrument panel) substantially blocks outside light from coming into the intermediate field of vision where the lens is clear. The present invention greatly improves the pilot's ability to see the instrument panel and make viewing between highly contrasting fields of vision less stressful.

The present invention may be applied to ordinary sunglasses, mounted in "clip on" sunglasses, incorporated into prescription sunglasses, used in goggles which can have a single lens where the tinting is applied in front of the eyes, or the disclosed tintings can be applied to a visor that typically is part of a helmet used for flying.

In the present invention, photochromic lenses can be used in conjunction with fixed density tinting. The photochromic properties of the lens can also be vignetted.

The tinting on the lenses of the present invention is considered to be neutral density in the preferred embodiment. However, color tintings that are typically used in aviator's sunglasses, that is, green, brown and yellow, may be used.

In the present invention, vignetted tinting may be used for far field viewing. There is a discontinuity between at least two of the tintings in the different fields of vision. In addition, the tinting on the sunglasses of the present invention can have a gradient in the tinting opposite to that used on ordinary vignetted sunglasses. That is, the tinting can begin light at the top of the lens and increase in density towards the center of the lens. This would tend to block the high intensity of light coming from clouds below the horizontal plane when viewing outside the cockpit.

The coverage of the tinting on the lenses in the present invention in the far field can vary and may be dependent on the type of aircraft flown and/or the seat in which the pilot sits (left or right side of airplane).

In the present invention, the density of the tinting, especially of the far field, may be optimized for the geographic location and season.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiment set forth herein for purposes of exemplification.

The present invention is directed to specially tinted lenses for use in flying airplanes. In the present invention, the far field of vision has medium to exceptionally dark tinting (Filter category between 2 and 6) to reduce the light from a sunlit sky, over sunlit cloud tops, or in clouds. This enables an aircraft pilot to easily see out of the cockpit into highly illuminated environments. The intermediate field of vision is essentially clear (Filter category 0) to enable the pilot to easily see a dimly illuminated instrument panel as compared to the high illumination outside that aircraft. The near field of vision may have a range of tinting from clear (Filter category 0) to medium (Filter category 3) for reading maps, etc. In addition, the change in tinting is discontinuous (i.e., sharp) from one field of vision to another. The present invention works because the aircraft structure (i.e., nose and instrument panel) substantially blocks outside light from coming into the intermediate field of vision where the lens is clear.

The density of the tinting on the lenses is based on the European Standard EN1836:1997. Under this standard, the density of the tinting of the sunglasses is numerically categorized as given in the following table:

| Filter Category Number (N) | Calculated Transmittance (T) | Approximate Transmittance Range | Density of Tinting on On Lenses | Brightness of Environment |
|---|---|---|---|---|
| 0 | 100.% | 80% to 100% | Clear or very light | Dim |
| 1 | 50.% | 43% to 80% | Light | Normal |
| 2 | 25.% | 18% to 43% | Medium | Normal |
| 3 | 12.5% | 8% to 18% | Dark | High |
| 4 | 6.25% | 3% to 8% | Very Dark | Exceptionally High |

The calculated transmittance (T) is the percentage of visible light that is transmitted through the lens as compared to the incident light onto the lens. T is related to the filter category number (N) as given in the following equation:

$$T = \left(\frac{1}{2}\right)^N \cdot 100 \qquad \text{(Equation 1)}$$

The concept of the filter category is extended for values of N of 5 and 6 having a calculated transmittances of 3.13% and 1.56%, respectively and represent exceptionally dark tinting. The use of filter category numbers (N) to describe the tinting of sunglasses is practical because the eye can sense change in filter density for one category number to the next. However, N is not restricted to integer values when relating it to transmittance values T.

The specially tinted lenses of the present invention are application-specific; that is, one cannot expect sunglasses made with these specially tinted lenses to be suitable for general use. The present invention works properly only in an aircraft cockpit or other such environment where a barrier substantially blocks the high ambient illumination from the intermediate and near viewing areas on the lens.

The tinting density and the pattern of the different tinting areas on the present invention may be custom made for the specific aircraft type because of the variations in shapes of the instrument panels and glare shields. The pattern of tinting may need to be customized depending on which seat the pilot may be sitting. Lastly, the density and type of tinting may need to be optimized for a pilot flying in tropical, temperate regions, or sub-arctic regions.

Observations in the sub-arctic region indicate particularly high contrasting viewing conditions at altitude between outside the cockpit and the instrument panel. In this region, cloud tops are typically lower than found in temperate or tropical regions and thus jet aircraft are typically more frequently above cloud tops in the sub-arctic than in temperate or tropical regions. In addition, lower sun angles with respect to the horizon in the sub-arctic as compared to the temperate or tropical regions probably produce less illumination coming into to the cockpit from above the horizontal plane which illuminates the interior of the cockpit, including the instrument panel. This puts the pilot in a viewing situation where the horizon can be brilliantly lit but the instrument panel is dimly lit.

The specially tinted lenses of the present invention are not limited to being mounted in just ordinary spectacles or sunglasses. The lenses can be mounted in "clip on" sunglasses, mounted in goggles wherein the goggles can have a single lens with tinting applied in front of the eyes, or the tintings can be applied to a visor that typically is part of a helmet used for flying.

The tri-tinting on the lenses of the preferred embodiment is considered to be of neutral density. However, color tintings that are typically used in aviator's sunglass, e.g., green, brown, and yellow, can be used. A primary embodiment of the present invention is that there is a discontinuity, or sharp contrast, between at least two of the viewing areas on the lens.

Vignetted tinting, generally known to those skilled in the art, may also be used for the far field of viewing. In addition, the vignetted tinting on the sunglasses of the present invention can have a gradient in the tinting opposite to that used on ordinary sunglasses. That is, the tinting can start off light at the top of the lens and increase in density towards the center of the lens. This would tend to block the high intensity of light coming from clouds below the horizontal plane when a pilot is viewing outside the cockpit.

Those skilled in the art will appreciate that the specially tinted lenses of the present invention could be photochromic, have UV protection, could be impact resistant or could be polarized. In addition, those skilled in the art will appreciate that the specially tinted lenses may be with or without correction (ophthalmic lenses) in any one or all of the fields of vision.

Figure 1:
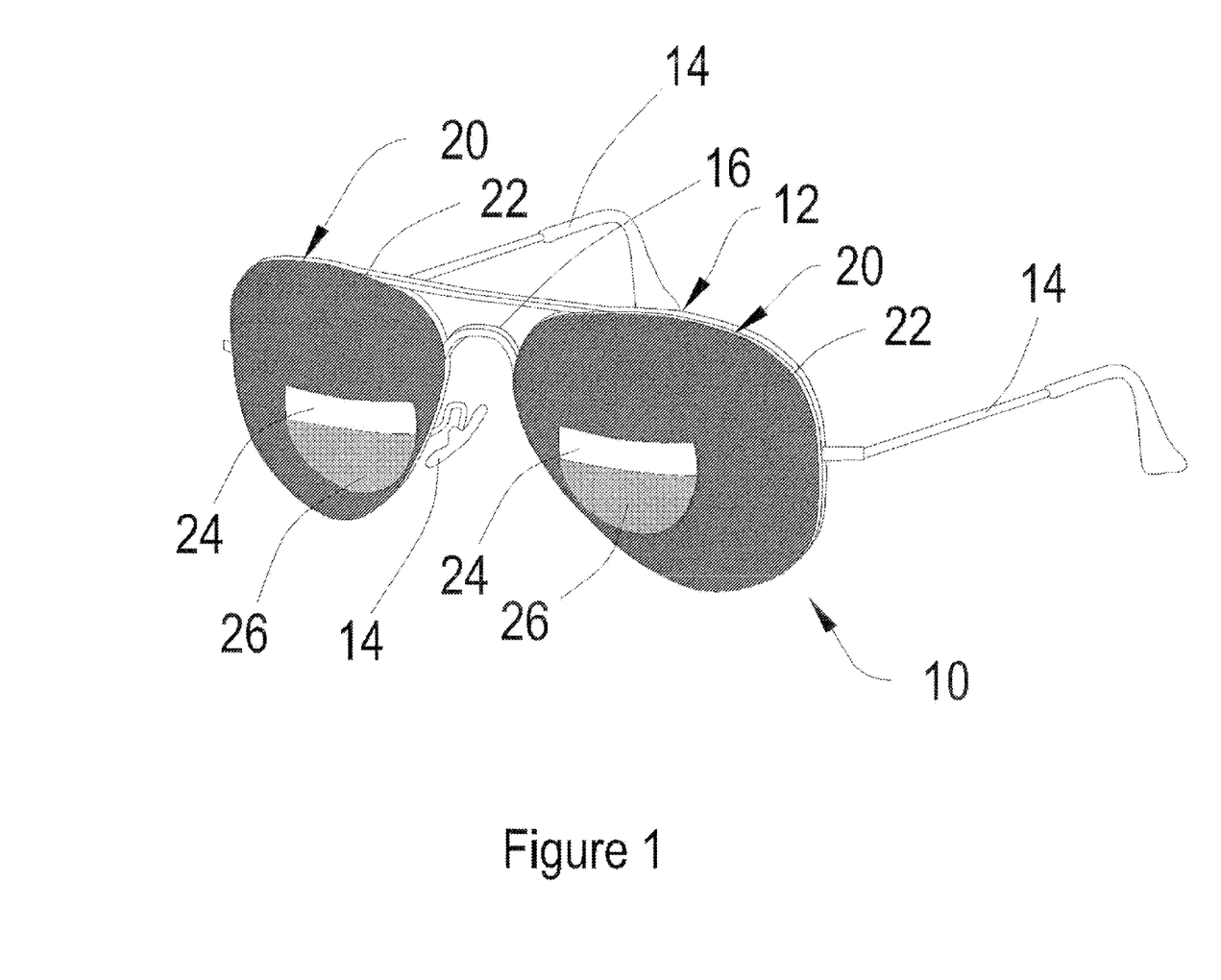
FIG. 1 illustrates a pair of sunglasses with specially tinted lenses suitable for wearing while flying an airplane as set forth in the present invention.

FIG. 1 shows an exemplary embodiment of the present invention. Those skilled in the art will appreciate that sunglasses 10 can be of any conventional design, comprising two lenses 20 mounted to a frame 12, to which two temples 14 are hingedly attached. Those skilled in the art will further appreciate that frame 12 can be of any design, but usually includes a nose piece 14 and/or bridge 16 that supports frame 12 on the wearer's face. These sunglasses can be made by those skilled in the art. Lenses 20 of the present invention are tri-tinted for the different fields of vision. In the preferred embodiment, far field of vision area 22 (large dark grey portion) has dark tinting, intermediate field of vision area 24 (horizontal clear portion) has no tinting, and near field of vision area 26 (small semi-circle portion) has light to medium tinting. Those skilled in the art will appreciate that the tinted fields of the lenses can be of any shape and can run predominantly horizontally, vertically or in any direction to best reduce the bright light and selectively allow dim light to reach the viewer's eyes.

Figure 2:
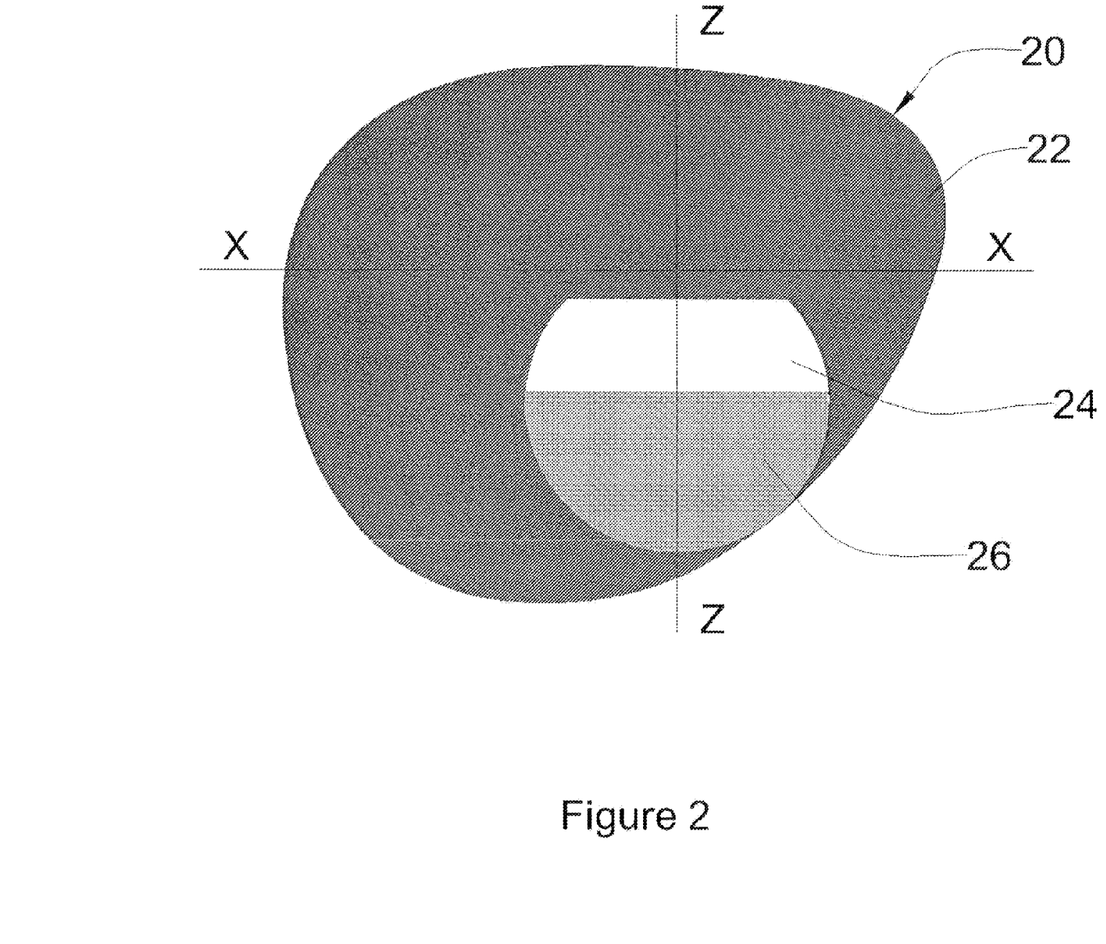
FIG. 2 illustrates a tri-tinted lens as set forth in the present invention, which is based on an ophthalmic trifocal in the shape typically used in aviator's sunglasses. These types of specially tinted lenses enable a pilot to comfortably see outside the cockpit, easily see the instrument panel, and also easily see reading material.

FIG. 2 shows another exemplary embodiment of the present invention, wherein lenses 20 are tri-tinted in order to reduce glare for the wearer when viewing in the near or intermediate field of vision from high illumination for the far field of vision. Lenses 20 may be used in either spectacles or sunglasses. Those skilled in the art will appreciate that lenses 20 can be without power, i.e., non-prescription lenses, or a prescription lens with power in one or more of the three viewing zones.

In this embodiment, lenses 20 have three different areas to enable the wearer to see in three fields of vision, a far field ($V_f$) 22 (typically where the eyes focus at infinity), an intermediate field of vision ($V_i$) 24 (where the eyes focuses at 32 inches (0.81 m)) and a near field of vision ($V_n$) 26 for reading (where the eyes focuses at 16 inches (0.41 m)). These distances are set forth in the Federal Aviation Agencies (FAA) standards required of a First Class Medical. 14 C.F.R. § 67.103. In the particular embodiment, $V_f$ 22 is tinted with approximately a filter category value of 4 ($N_f$~4), $V_i$ 24 with $N_i$~0 and $V_c$ 26 with $N_c$~2. The line XX passes through the center of the far field of view area on lens 20. As can be seen in FIG. 2, the dark tint extends below line XX approximately 2.5 mm at which point the lens transitions to the area for intermediate viewing and the lens is clear. The line ZZ passes though the centers of the intermediate 24 and near 26 fields of vision. The distance along ZZ is plotted as the ordinate (Y-axis) in FIG. 4 below.

Lenses 20 in the preferred embodiment have three distinct densities of tint. The tintings can be expressed as the transmittance through the lens or as filter category values. The tinting densities are applied in general to the three fields of vision as described above. For far field viewing 22, the lens has dark tinting, preferably having a filter category number between 2 and 6 (transmittance between 25% and 1.6%). For intermediate field viewing 24 the preferred embodiment has a filter category number of zero, i.e., no tinting (transmittance of 100%). For near field viewing 26 the preferred embodiment has a filter category value between 1 and 3 (transmittance between 50% and 12.5%).

The preferred embodiment is quantified in the following table for the neutral density tinting:

| Lens Viewing Area | Filter Category Number | Transmittance |
|---|---|---|
| $V_f$ | $2 \leq N_f \leq 6$ | $25\% \geq T_f \geq 1.56\%$ |
| $V_i$ | $0 \leq N_i \leq N_f - 1$ | $100\% \geq T_i \geq 2 \cdot T_f$ |
| $V_n$ | $N_i \leq N_n \leq N_f$ | $T_i \geq T_n \geq T_f$ | where:
$N_f$ is the filter category number of the tinting in the far field of viewing area on the lens ($V_f$),
$N_i$ is the filter category number of the tinting in the intermediate field of viewing area on the lens ($V_i$),
$N_n$ is the filter category number of the tinting in the near field of viewing area on the lens ($V_n$)
$T_f$ is the transmittance of the tinting of $V_f$,
$T_i$ is the transmittance of the tinting of $V_i$,
$T_n$ is the transmittance of the tinting of $V_n$.

It is envisioned that a pilot will initially evaluate a pair of these special purposes sunglasses having initial tintings as follows: $N_f$=4, $N_i$=0, $N_n$=2. Pilots can have the tintings changed as required for their situations.

On the ophthalmic trifocal, the tinting for distant viewing can cover some of the area on the intermediate portion of the lens so as to prevent high illumination from outside the cockpit from interfering with the pilot's viewing of the instrument panel. That is, for a typical trifocal lens the intermediate distant area on the lens may be larger than what is required to adequately view the instrument panel.

Light sources of excessive brightness or uneven distribution in the field of view can cause glare, which may in turn cause a mild sensation of discomfort or an intolerable feeling of pain. The physiological origins of this discomfort has been extensively studied and discussed by those skilled in the art. To reduce glare, it is imperative that high intensity illumination from outside the cockpit be substantially reduced before it reaches the pilot's eyes. For example, those skilled in the art recognize that the intensity of a glare source can be quantified.

U.S. Pat. No. 4,338,003 granted to Adrian describes an equation that relates the glare experienced to the intensity of the illumination that causes the glare. This formula takes into account the viewer's age as a factor of the glare illumination, and is referred to as "equivalent stray-light illumination:"

$$L_{saq} = \frac{K \cdot E_{B1}}{\theta^2} \qquad \text{(Equation 2)}$$

where $L_{saq}$ is intensity of the glare in candles/meter$^2$ (cd/m$^2$); K is an age-dependent constant approximately 10 for the age group between 20 and 30, $E_{B1}$ is the illumination in lux (lx) produced by the source of glare in the plane of the eye normal to the direction of viewing, and $\theta$ is the angle between the viewed object and the centre of the source of glare in degrees.

The equivalent illumination in lux of the glare can be estimated from the intensity of the glare ($L_{saq}$) as follows:

$$E_{saq} = \frac{L_{saq}}{4 \cdot \pi} \qquad \text{(Equation 3)}$$

As stated above, the average illumination entering the cockpit of an airplane through the windshield can typically be 9,000 lux. The angle between the upper part of the instrument panel and the lower part of the windshield is approximately 12°. Applying these values to Equation 2, the intensity of the glare in the cockpit is approximately 625 cd/m$^2$, which results in an approximate equivalent illumination of 50 lux to the pilot's eyes (Equation 3). This indicates that the glare a pilot can experience while viewing the instruments can easily be of the order of the illumination of the instruments themselves.

The example above using Equation 2 to estimate the equivalent stray-light illumination is conservative if not underestimated by a factor of 10 because the illumination from outside the cockpit that strikes the pilot's eye was not integrated over the entire viewing scene. From practical experience in the sub-artic the glare can be so intense it is like viewing the instruments through a translucent vale.

Figure 3:
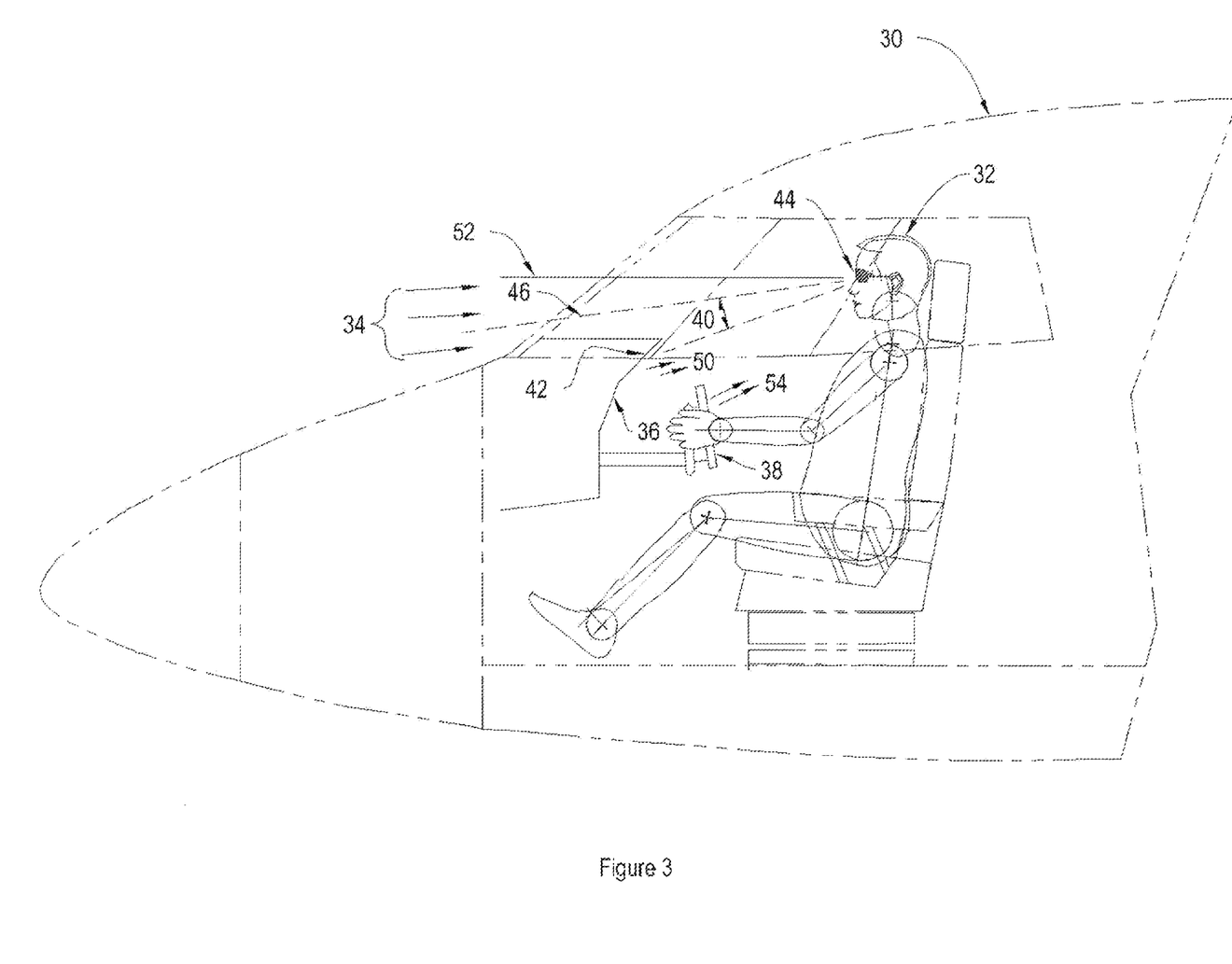
FIG. 3 illustrates a cross-sectional view of an aircraft cockpit showing the approximate location where one of the pilots sits and the differing levels of illuminations from the high ambient light outside the cockpit to the low level of illumination from the instrument panel.

FIG. 3 shows a cross-sectional view of jet aircraft cockpit 30 showing the location where the pilot is seated 32. The pilot 32 typically is required to view outside the aircraft 34, the instrument panel (36 and 42) and paper or an electronic display on what is frequently called the approach plate holder 38. The pilot 32 frequently has to look back and forth between these three viewing scenes 34, 36 and 38 in rapid succession. The high illumination from outside the cockpit and below the horizontal plane 34 when combined with the small angle 40 formed from the upper part of the instrument panel 42, the pilot's eyes 44 and the lower portion of the airplane's windscreen 46 is a major contributor to the high level of glare experienced by pilots (Equations 2 and 3).

One of the starkest lighting situations between the outside illumination 34 and the lighting from of the instrument panel 50 commonly occurs when flying above a relatively uniform cloud deck with a clear sky above. In this situation, the highest illumination 34 is coming from below the horizontal plane 52. Also in this situation, there can be relatively little direct outside light illuminating the instrument panel (36 and 42). In this case, the illumination from outside the cockpit and below the horizontal plane 52 can be more than 100 times greater than the illumination from the instrument panel (36 and 42).

Under the above lighting situation, if the pilot is wearing sunglasses with sufficiently dark uniform tinting to make viewing outside the cockpit 34 comfortable, viewing the instrument panel (36 and 42) can be difficult because the instruments appear too dark. If the pilot is wearing vignetted sunglasses, high illumination can be admitted to the pilot's eyes from just above the instrument panel 46 from outside the cockpit, which may not help reduce the contrast between the illumination from outside the cockpit 34 and the illumination from the instruments 50. In addition, the high illumination from outside the cockpit 34 admitted to the pilot's eyes can cause unacceptable glare, which renders the instruments hard to read. The severity of the glare is caused in part because of the small angle 40 between the outside illumination 34 and the illumination from the instrument panel 50.

Observations indicate that the illumination from the approach plate holder 54 is usually noticeable brighter than the illumination from the instrument panel (36 and 42). Thus, the pilot is frequently faced with having to view three drastically different illuminated screens.

Figure 4:
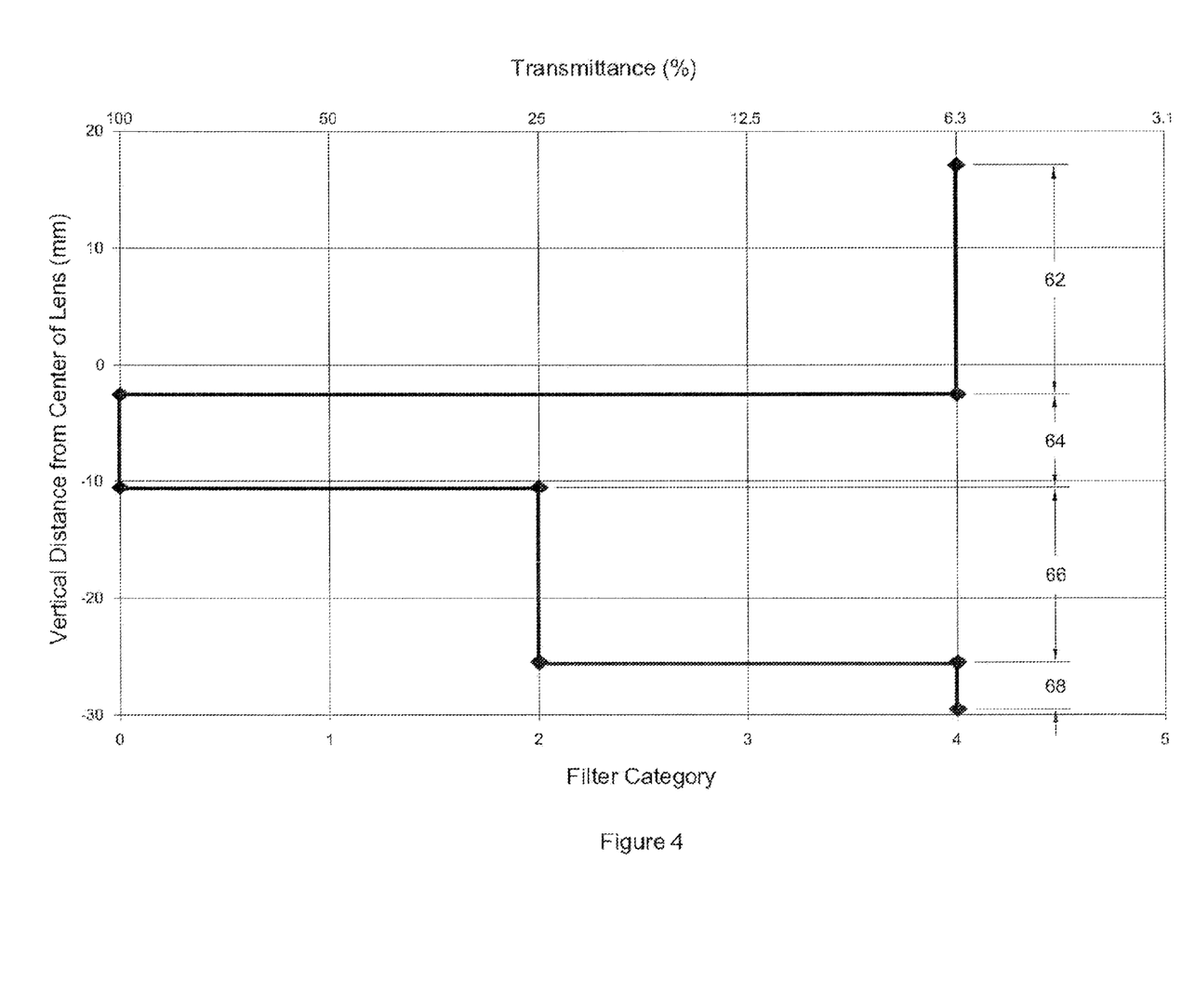
FIG. 4 illustrates the tinting density of the present invention within a system of Cartesian coordinates having in the abscissa (X-axis) the filter category number of the tinting and in the ordinate (Y-axis) the vertical distance from the center of the lens as depicted in FIG. 2.

FIG. 4 shows the density of the tinting as a function of the distance from the center of the lends. The ordinate (Y-axis) is the distance along line ZZ in FIG. 2. There is a discontinuous change in the tinting density between the three fields of vision for the different viewing distances as delineated in FIG. 2 above. On FIG. 4 62 is the tinting in the far field of vision in FIG. 2 (22), 64 is the clear area in FIG. 2 (24) and 66 is the tinting on the area on the lens for near viewing. Lastly 68 is the discontinuous transition from the area on the lens for near viewing (FIG. 2, 26) back to the area on the lens for distant viewing (FIG. 2, 22). This lower part of the lens (FIG. 2, 22) is not intended for viewing distant objects but the dark tinting will prevent high illumination for coming into the pilot's eyes especially if the pilot has the need to look vertically at an overhead panel.

Whereas, the present invention has been described in relation to the drawings attached hereto, it should be understood that other and further modifications, apart from those shown or suggested herein, may be made within the spirit and scope of this invention.

What is claimed is:

1. Specially tinted lenses for sunglasses worn by a pilot for use during flying an airplane, comprising:
   two lens bodies;
   said lens bodies having at least two distinct, contrasting tintings between at least three fields of vision;
   a far field of vision tinted sufficient to prevent the high illumination from outside said airplane's cockpit from entering said pilot's eyes;
   an intermediate field of vision tinted to enable said pilot to easily see a dimly illuminated instrument panel; and
   a near field of vision tinted to enable said pilot to easily view maps and other information.

2. The specially tinted lenses of claim 1 further comprising:

a first tinting for said far field of vision that is highly tinted having a neutral filter category number range between 2 and 6 (transmittance between 25% and 1.56%);

a second tinting for said intermediate field of vision that is tinted having a neutral filter category number range between 0 (transmittance of 100%) and 1 filter category number less than said first tinting's neutral filter category number; and a third tinting for said near field of vision that is tinted having a neutral filter category number range greater than or equal to said second tinting neutral filter category number and less than or equal to said first tinting neutral filter category number.

3. The specially tinted lenses of claim 1 wherein said tintings are discontinuous and sharp between said at least three fields of vision.

4. The specially tinted lenses of claim 1 wherein said lens bodies are prescription lenses.

5. The specially tinted lenses of claim 4 wherein said first tinting overlaps with said second viewing area on the lens and said third tinting so as to prevent high illumination from outside said cockpit from interfering with said pilot's viewing of said airplane's instrument panel.

6. The specially tinted lenses of claim 1 wherein said first tinting is vignetted tinting.

7. The specially tinted lenses of claim 1 wherein said tintings are a color tinting.

8. The specially tinted lenses of claim 1 wherein said tintings are photochromic.

9. The specially tinted lenses of claim 1 wherein said lens bodies include UV protection.

10. The specially tinted lenses of claim 1 wherein said lens bodies are impact resistant.

11. The specially tinted lenses of claim 1 wherein said lens bodies are polarized.

12. Specially tinted lenses for sunglasses worn by a pilot for use during flying an airplane, comprising:

two lens bodies;

said lens bodies having at least two distinct, contrasting tintings between at least three fields of vision;

a first tinting for far field of vision viewing sufficient to prevent the high illumination from outside said airplane's cockpit from entering said pilot's eyes;

wherein said first tinting is highly tinted having a neutral filter category number range between 2 and 6 (transmittance between 25% and 1.56%);

a second tinting for intermediate field of vision viewing to enable said pilot to easily see a dimly illuminated instrument panel;

wherein said second tinting is tinted having a neutral filter category number range between 0 (transmittance of 100%) and 1 filter category number less than said first tinting's neutral filter category number;

a third tinting for near field of vision viewing enabling said pilot to view maps and other information;

wherein said third tinting is tinted having a neutral filter category number range greater than or equal to said second tinting neutral filter category number and less than or equal to said first tinting neutral filter category number; and wherein said tintings are discontinuous and sharp between said at least three fields of vision.

13. The specially tinted lenses of claim 12 wherein said lens bodies are prescription lenses.

14. The specially tinted lenses of claim 13 wherein said first tinting overlaps with said second viewing area on the lens and said third tinting so as to prevent high illumination from outside said cockpit from interfering with said pilot's viewing of said airplane's instrument panel.

15. The specially tinted lenses of claim 12 wherein said first tinting is vignetted tinting.

16. The specially tinted lenses of claim 12 wherein said tintings are a color tinting.

17. The specially tinted lenses of claim 12 wherein said tintings are photochromic.

18. The specially tinted lenses of claim 12 wherein said lens bodies include UV protection.

19. The specially tinted lenses of claim 12 wherein said lens bodies are impact resistant.

20. The specially tinted lenses of claim 12 wherein said lens bodies are polarized.

* * * * *